(12) United States Patent
Bagley

(10) Patent No.: US 12,429,941 B2
(45) Date of Patent: Sep. 30, 2025

(54) MOTION SENSOR CALIBRATION FOR FULL BODY OR PARTIAL BODY TRACKING

(71) Applicant: VRChat Inc., San Francisco, CA (US)

(72) Inventor: Benjamin Bagley, Maebashi (JP)

(73) Assignee: VRChat Inc., San Francisco, CA (US)

( * ) Notice: Subject to any disclaimer, the term of this patent is extended or adjusted under 35 U.S.C. 154(b) by 218 days.

(21) Appl. No.: 18/190,505

(22) Filed: Mar. 27, 2023

(65) Prior Publication Data
US 2024/0329727 A1 Oct. 3, 2024

(51) Int. Cl.
G06F 3/01 (2006.01)
G06T 13/40 (2011.01)
G06T 15/00 (2011.01)

(52) U.S. Cl.
CPC .............. *G06F 3/011* (2013.01); *G06T 13/40* (2013.01); *G06T 15/00* (2013.01)

(58) Field of Classification Search
None
See application file for complete search history.

(56) References Cited

U.S. PATENT DOCUMENTS

| 2020/0341542 A1 | 10/2020 | Kur et al. |
| 2021/0312684 A1 | 10/2021 | Zimmermann et al. |
| 2021/0373676 A1 | 12/2021 | Jorasch et al. |
| 2022/0054042 A1* | 2/2022 | Kobayashi ............... A61B 5/11 |

OTHER PUBLICATIONS

International Search Report; dated May 23, 2024; Application # PCT/US24/18329.

* cited by examiner

*Primary Examiner* — Edward Martello
(74) *Attorney, Agent, or Firm* — Polsinelli PC

(57) ABSTRACT

The present technology pertains to full body or partial body tracking in a multiuser extended reality (XR) application. A client device executing in the multiuser XR application may be configured to determine a plurality of zones associated with the wearer; map a first motion sensor from the at least one motion sensor to a corresponding zone, wherein the first motion sensor corresponds to a first zone; determine a first measured offset based on a distance from a position of the first motion sensor within the first zone to a fixed point within the first zone; receive first motion data of the wearer from the first motion sensor; map the first motion data to an avatar within a virtual world based on the first measured offset; and render the avatar within the virtual world based on the first motion data associated with the first zone.

18 Claims, 11 Drawing Sheets

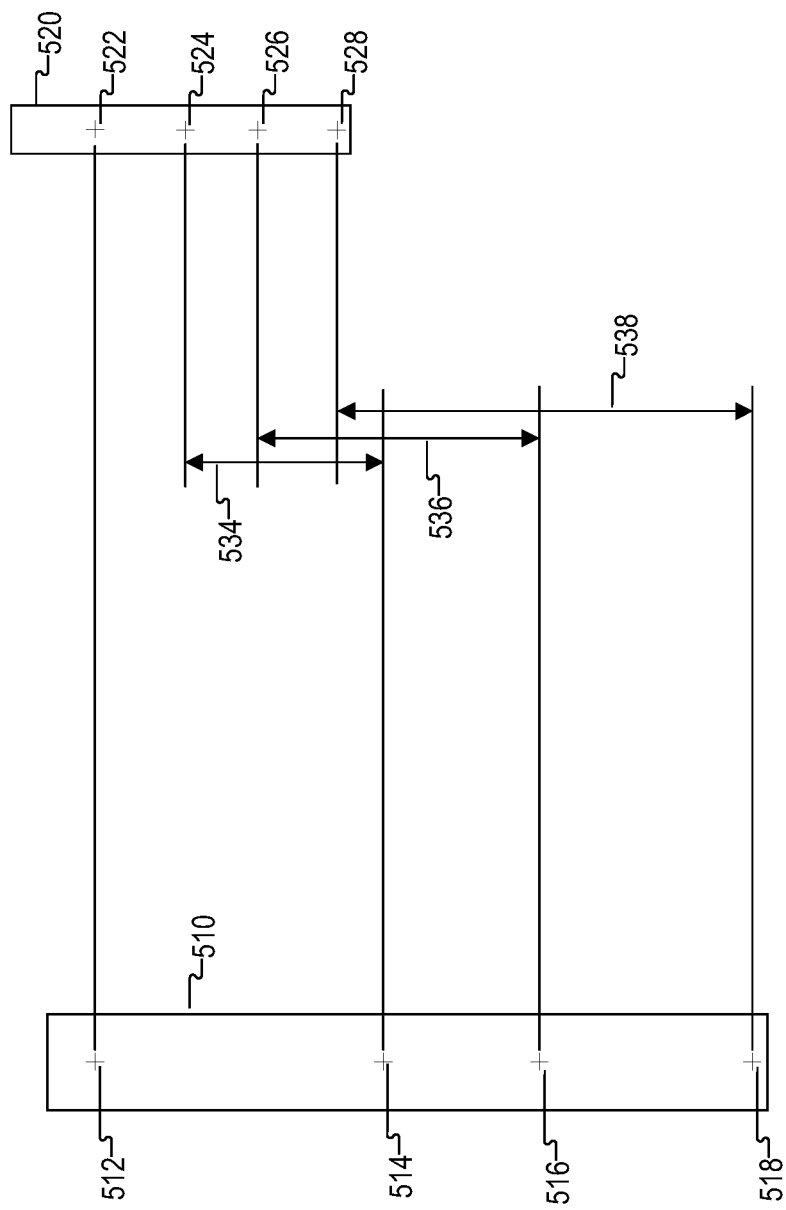

MOTION SENSOR CALIBRATION FOR FULL BODY OR PARTIAL BODY TRACKING

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be the shape of the shoulders and a head without any distinguishing features. Some avatars can be complex and can be associated with detailed graphics, and textures, and can be capable of various animations. For example, some avatars include a number of portions that are separately animated for realistic or non-realistic motion, e.g. hair, tails, cars, clothing, etc. In some cases, a multiuser virtual reality application can have hundreds of avatars and corresponding client devices interacting within that environment.

SUMMARY

In some examples, systems and techniques are described for tracking motion and mapping motion into a virtual world. The systems and techniques can improve the tracking of motion in the physical world and map that motion into the virtual world to improve visual fidelity and the immersive experience.

According to at least one example, a method includes: receiving data from at least one motion sensor, wherein each motion sensor from the at least one motion sensor are attached to a different body part of a wearer for tracking movement of the wearer; determining a plurality of zones associated with the wearer, wherein each zone corresponds to motion of a body part or a joint of the wearer that can be tracked; mapping a first motion sensor from the at least one motion sensor to a corresponding zone, wherein the first motion sensor corresponds to a first zone; determining a first measured offset based on a distance from a position of the first motion sensor within the first zone to a fixed point within the first zone; receiving first motion data of the wearer from the first motion sensor; mapping the first motion data to an avatar within a virtual world based on the first measured offset; and rendering the avatar within the virtual world based on the first motion data associated with the first zone. For example, the device receives data from at least one motion sensor, wherein each motion sensor from the at least one motion sensor are attached to a different body part of a wearer for tracking movement of the wearer; determines a plurality of zones associated with the wearer, wherein each zone corresponds to motion of a body part or a joint of the wearer that can be tracked; maps a first motion sensor from the at least one motion sensor to a corresponding zone, wherein the first motion sensor corresponds to a first zone; determines a first measured offset based on a distance from a position of the first motion sensor within the first zone to a fixed point within the first zone; receives first motion data of the wearer from the first motion sensor; maps the first motion data to an avatar within a virtual world based on the first measured offset; and renders the avatar within the virtual world based on the first motion data associated with the first zone.

In another example, an apparatus is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus name to: receive data from at least one motion sensor, wherein each motion sensor from the at least one motion sensor are attached to a different body part of a wearer for tracking movement of the wearer; determine a plurality of zones associated with the wearer, wherein each zone corresponds to motion of a body part or a joint of the wearer than can be tracked; map a first motion sensor from the at least one motion sensor to a corresponding zone, wherein the first motion sensor corresponds to a first zone; determine a first measured offset based on a distance from a position of the first motion sensor within the first zone to a fixed point within the first zone; receive first motion data of the wearer from the first motion sensor; map the first motion data to an avatar within a virtual world based on the first measured offset; and render the avatar within the virtual world based on the first motion data associated with the first zone.

Aspects of the disclosure include a two offset system that enable mapping of motion from the physical world in the virtual world. The disclosed offsets of the avatar can map motion from the physical world into the virtual world with high fidelity to create an immersive and engaging experience. When the user changes an avatar with different proportions, the disclosed aspects allow seamless change between avatars without requiring a separate calibration. For example, an XR multiuser application can map the user's position at the time the user switches from the first avatar to the second avatar without requiring any calibration.

BRIEF DESCRIPTION OF THE DRAWINGS

To easily identify the discussion of any particular element or act, the most significant digit or digits in a reference number refer to the figure number in which that element is first introduced.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 5 illustrates a conceptual diagram of determining avatar offsets to apply to an avatar in an extended reality (XR) multiuser application in accordance with aspects of the disclosure.

DETAILED DESCRIPTION

Figure 1:
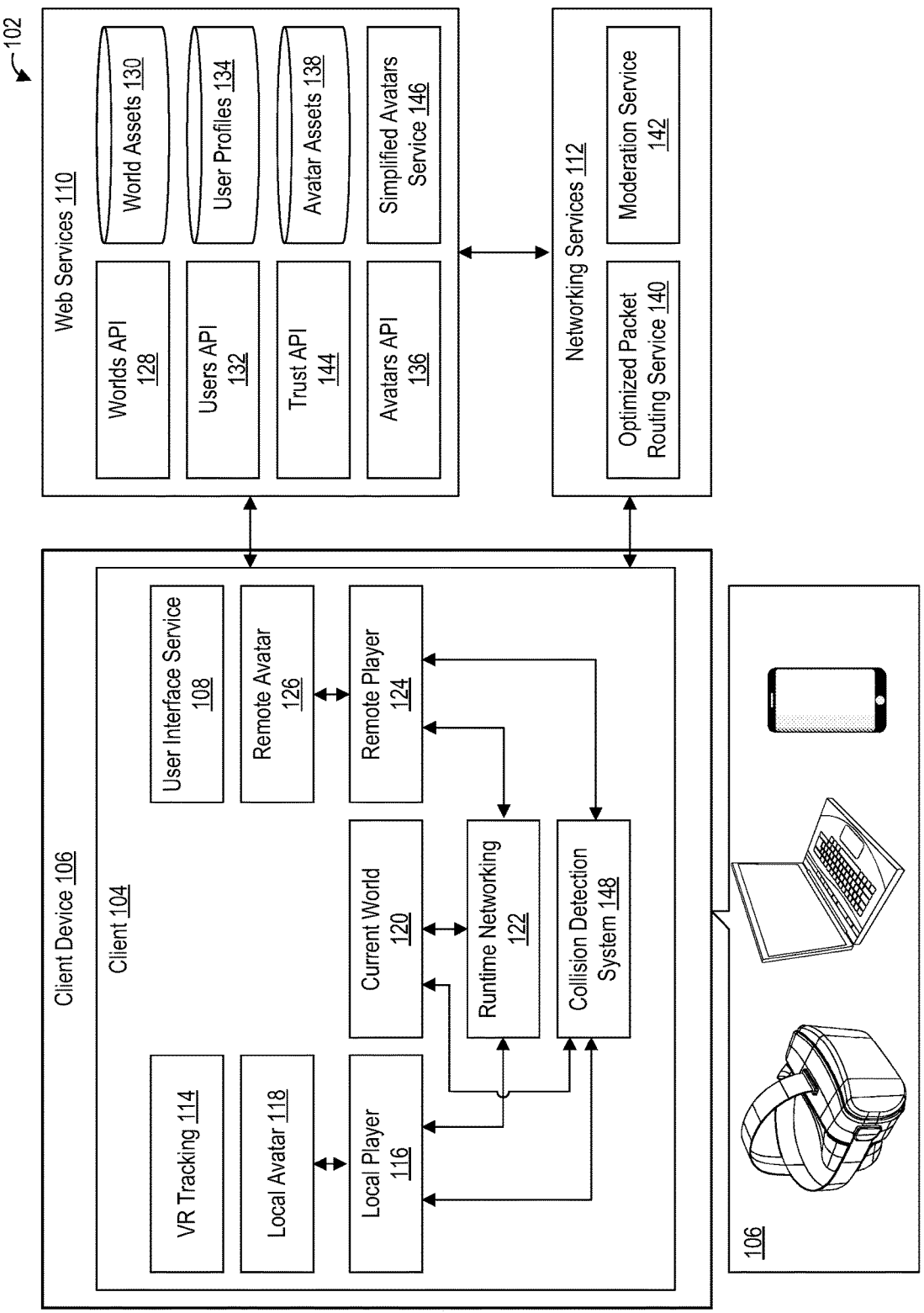
FIG. 1 illustrates an example virtual world platform for playing and hosting a multiplayer virtual reality (VR) experience in accordance with some aspects of the present technology.

Interactions between users in virtual worlds such as those hosted by some virtual reality (VR) platforms continue to evolve. Initially, interactions were limited to co-existing in the same world and playing a game together. Interactions progressed to live communications, and then to attending virtual events together. Recently, users have begun to increase the range of motion of their avatars to interact within these virtual worlds and with objects within the virtual world. For example, characters within the virtual world are now able to exercise or dance at a nightclub in virtual worlds, and various contact-based interactions between characters can occur and trigger events that occur within the virtual world.

Virtual worlds are three dimensional (3D) spaces that can have a range of interactions including interactions within the environment and interactions with other avatars. In some cases, interaction within the environment can be performed with an input controller, which provides an interface to interact with the environment. A game controller can be a type of input controller, and an input controller can also include a VR controller that may provide data to identify a point in space where the VR controller is physically positioned. For example, a VR controller can be used to identify a point in space and an orientation of the VR controller.

Virtual worlds may implement inverse kinematics (IK), which is the mathematical process of calculating the variable joint parameters needed to place the end of a kinematic chain, such as a robot manipulator or animation character's skeleton, in a given position and orientation relative to the start of the chain. IK can be used to determine a position of various aspects of a virtual world, such as a location of a player's arm within the virtual world.

Using a VR controller or another conventional input controller can only provide a limited range of input within the virtual world and IK alone cannot accurately determine a position corresponding body parts of avatars within the virtual world. For example, IK may accurately determine position of a wrist that corresponds to a VR controller's location in space, but IK may not accurately determine a position of the elbow due to a position of the person's shoulder, which is capable of multiple types of movement within physical space.

Some virtual worlds can support more complex interactions based on using full-body tracking, which can be accomplished using various techniques. One technique is using a number of motion sensors, such as inertia measurement units (IMUs) that are positioned at various locations on the body, which is referred to as inside-out tracking. Other examples of motion sensors include cameras, photodiodes, gyrometers, accelerometers, time of flight (ToF) sensors, and so forth. Inside-out tracking refers to using sensors attached to a person to track their movement and position. Another technique of full-body tracking is using a full-body tracking suit with objects that are tracked using an external system, which is referred to as outside-in tracking. Outside-in tracking refers to using an external sensor system that identifies the movement and position of the tracked subject. Another technique of full-body tracking is attaching objects to the body that are tracked using an external system such as suits, straps, or other attachment methods.

Complex movements in the virtual world can be accomplished with full body tracking that requires a number of motion sensors to track the positions of shoulders, elbows, hips, feet, and knees. However, motion in the physical world is difficult to track because motion is tracked using external devices that do not directly identify different types of movement (e.g., cartesian, rotational, etc.). Further, motion is not necessarily directly translatable into a virtual world because of differences in proportions, sizes, and differences between a virtual avatar and a human person. For example, a virtual avatar can be a robot that has proportions that are different than the proportions of a person. In another example, the virtual avatar may be a dinosaur that has fundamentally different anatomical proportions than a person.

An aspect of the present technology relates to calibrating motion sensors based on provided information. For example, the user's height may be provided to a system that performs full or partial body tracking, and the present technology may determine zones based on their height for calibrating each corresponding sensor. In some cases, the fixed point of interest may be a joint such as a knee or an ankle, but can also be related to a bone such as a humerus. The zone identifies an expected region for the sensor to be within based on the user's height. The present technology may also determine a calibration associated with the motion sensors based on a fixed point of interest within a zone associated with a body part, which is used to identify suitable movement. For example, complex movement of shoulders and arms may be determined in combination with a held controller and a fixed sensor attached to the user's humerus. The offsets can be used to identify motion within the physical world that can be accurately mapped into the virtual world.

An aspect of the present technology also relates to mapping motions detected within the physical world to a corresponding avatar in the virtual world. In some aspects, a fixed point associated with a feature of an avatar may be aligned with an estimated position based on the user. For example, an estimated position of the eyes of the user (based on the user's input height) and the position of the avatar's eyes may be aligned in space, and calibration offsets may be determined from a fixed point on the user's body (e.g., an ankle, a center point of a humerus) to a fixed point on the avatar's geometry. The present technology uses avatars offsets and calibration offsets to map motion in the physical world into the virtual world. For example, based on the calibration offsets and the avatar offsets, movement within the physical world can be accurately mapped into the virtual world irrespective of proportional differences, differences in the anatomical configuration of the avatar, and so forth. According to aspects of the disclosure, the disclosed offsets of the avatar can map motion from the physical world into the virtual world with high fidelity to create an immersive and engaging experience. When the user changes an avatar with different proportions, the disclosed aspects allow seamless change between avatars without requiring a separate calibration. For example, an XR multiuser application can map the user's position at the time the user switches from the first avatar to the second avatar without requiring any calibration, and the second avatar will be aligned, scaled, and positioned in the virtual world without creating any visual artifacts.

FIG. 1 illustrates an example virtual world platform 102 for playing and hosting a multiplayer VR experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally store and provide long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first-person inputs from a user of the client device 106 upon which client 104 is executing and handles third-party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends list, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of the client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio- and-visually mute anybody who is not a friend.

After a user has selected a virtual world from the menu provided by the user interface service 108, client 104 can download an instance of the virtual world by calling the worlds API 128, which can retrieve the virtual world from world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics. In some aspects the avatar assets include colliders and receivers defined on portions of the avatar, or a tree of transforms that cause portions of the avatar to exhibit secondary motion behaviors (e.g., dynamic or physics bones (aka phys. bones) are examples systems that can configure portions of the avatar to exhibit secondary motion behaviors).

The downloaded instance of the virtual world can be executed by client 104 as a current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The client 104 can also support contact interactions between avatars, a portion of an avatar with another portion of the same avatar, or a portion of an avatar with an object in a virtual world. In order to detect these interactions, the client 104 can be configured to detect collisions between objects using the collision detection system 148. In some embodiments, the collision detection system 148 can be a broad phase collision detection system.

The current world 120 also has features that require networking. The current world 120 could have objects that a user can interact with and dynamically change aspects of the current world 120, and the object needs to broadcast its state across the network so that other users in the current world 120 can view the current state of the object. In one illustrative example, the current world 120 can include a light switch that dynamically affects a light source within the current world 120, such as turning on or off the light.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking service such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual world platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
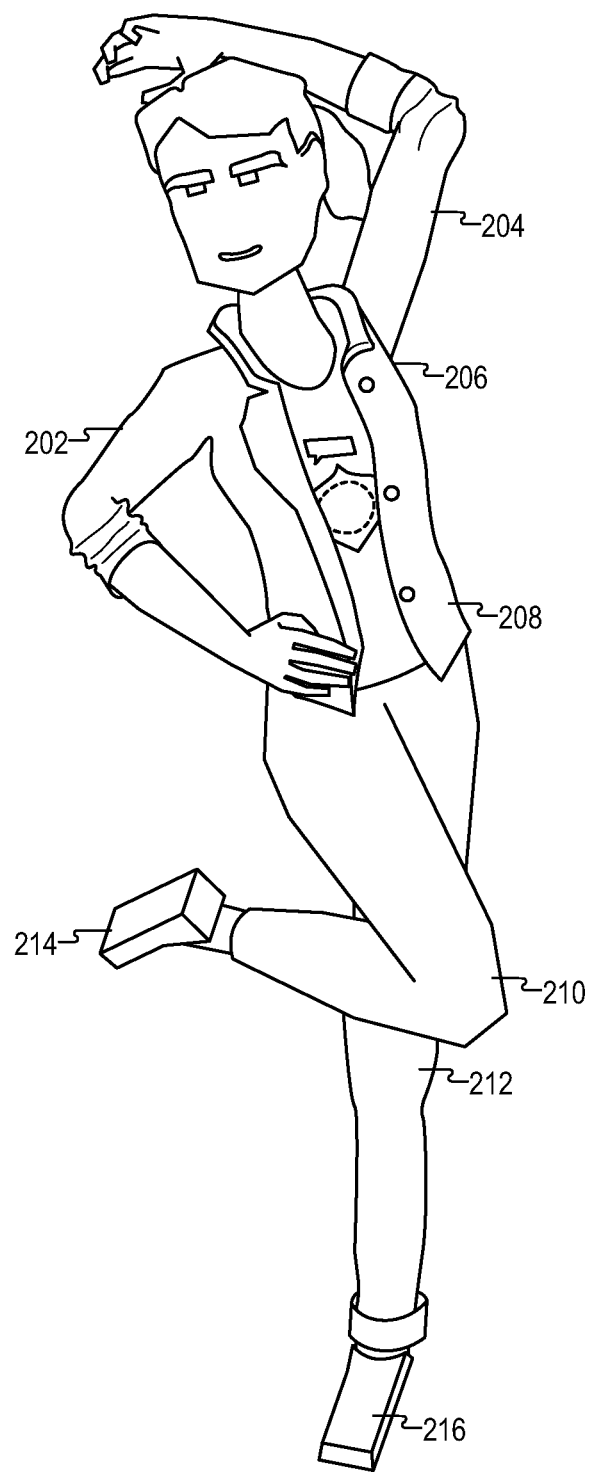
FIG. 2 illustrates an example rendering of an animation of an avatar that can be performed using full body tracking in accordance with some aspects of the disclosure.

FIG. 2 illustrates an example rendering of an animation of an avatar that can be performed using full body tracking in accordance with some aspects of the disclosure. As will be further described with reference to FIG. 3, the user can wear motion sensors on various body parts to enable the wearer to perform motion that is tracked from the physical world and mapped into the virtual world. Conventionally, a person can hold a VR controller for input associated with the hands and may also have a VR headset that tracks the orientation of the person's head. However, the animation illustrated in FIG. 2 cannot be performed using conventional approaches because different regions cannot be directly mapped from the physical world in the virtual world. Conventionally, multiuser applications can trigger a programmed effect, but dynamic positioning as illustrated in FIG. 2 that is applied in the physical world cannot be mapped without an additional motion controller.

In one illustrative aspect, the user (e.g., the wearer) may have a plurality of motion sensors that can be attached to the user's body for tracking motion to achieve the motion and non-verbal communication illustrated in FIG. 2. The number of motion sensors may vary based on the desired quantity of motion tracking. For example, the user may have three motion sensors and may attach the sensors in a right arm region 202, a left arm region 204, and a chest region 206. For clarity, the regions are identified based on their orientation as perceived by the user.

In this example, the user may use the motion sensors for upper body tracking, and additional controllers such as the VR controller (not shown) that is held by the user can be used to identify additional movement. The VR controller is physically held and provides a reference for hand position, but can also include additional controls such as a joystick, buttons, and so forth. In some aspects, the VR controller and the arm motion sensors can be used to determine a shoulder position. Based on the three motion sensors, the VR headset, and the VR controllers, the user may be able to obtain upper body tracking, which can be used for various interactions in the virtual world. For example, the user can high five another player, which can create interactive effects (e.g., emit fireworks, emit a halo, and so forth) within the virtual world.

The interactive effects can be designed by users, subject to some limitations and approval processes to ensure offensive content is restricted.

In another example, the user can attach a motion sensor to a hip region 208, a right knee region 210, a left knee region 212, a right foot region 214, and a left foot region 216. Attaching motion sensors to the hip region 208, the right knee region 210, the left knee region 212, the right foot region 214, and the left foot region 216 would enable lower body tracking and movements. In some aspects, the lower body sensors can be used for playing a virtual game or a virtual sport, such as a game of soccer, dancing, or other activity that can be engaged within the virtual world.

To animate the various motions, the motion can be applied to an IK solution to identify motion and animate the avatar within the world.

In some aspects, the motion sensors should be calibrated to align the user's motion to the avatar. For example, the height of the avatar within the virtual may be different than the height of the user. Calibration of the motion sensor may be difficult because the physical placement of the motion sensor will vary based on the user, various extrinsic factors such as clothes or environment, the type of sensor, and other factors. Calibration errors can propagate when applied to the virtual world and create incorrect motion, impossible motions, and other effects that negatively affect the user experience. Further, calibration errors may be amplified when a user switches their representative avatar and also negatively affects the user experience.

A high-quality experience within the virtual world improves immersion, increases engagement with other avatars, and provides meaningful engagement. Virtual worlds can be used for many different functions such as business meeting, creative planning, games, sports, and creation functions (e.g., music), and providing high-quality experiences increase opportunities to grow virtual worlds and enhance connectivity.

Figure 3:
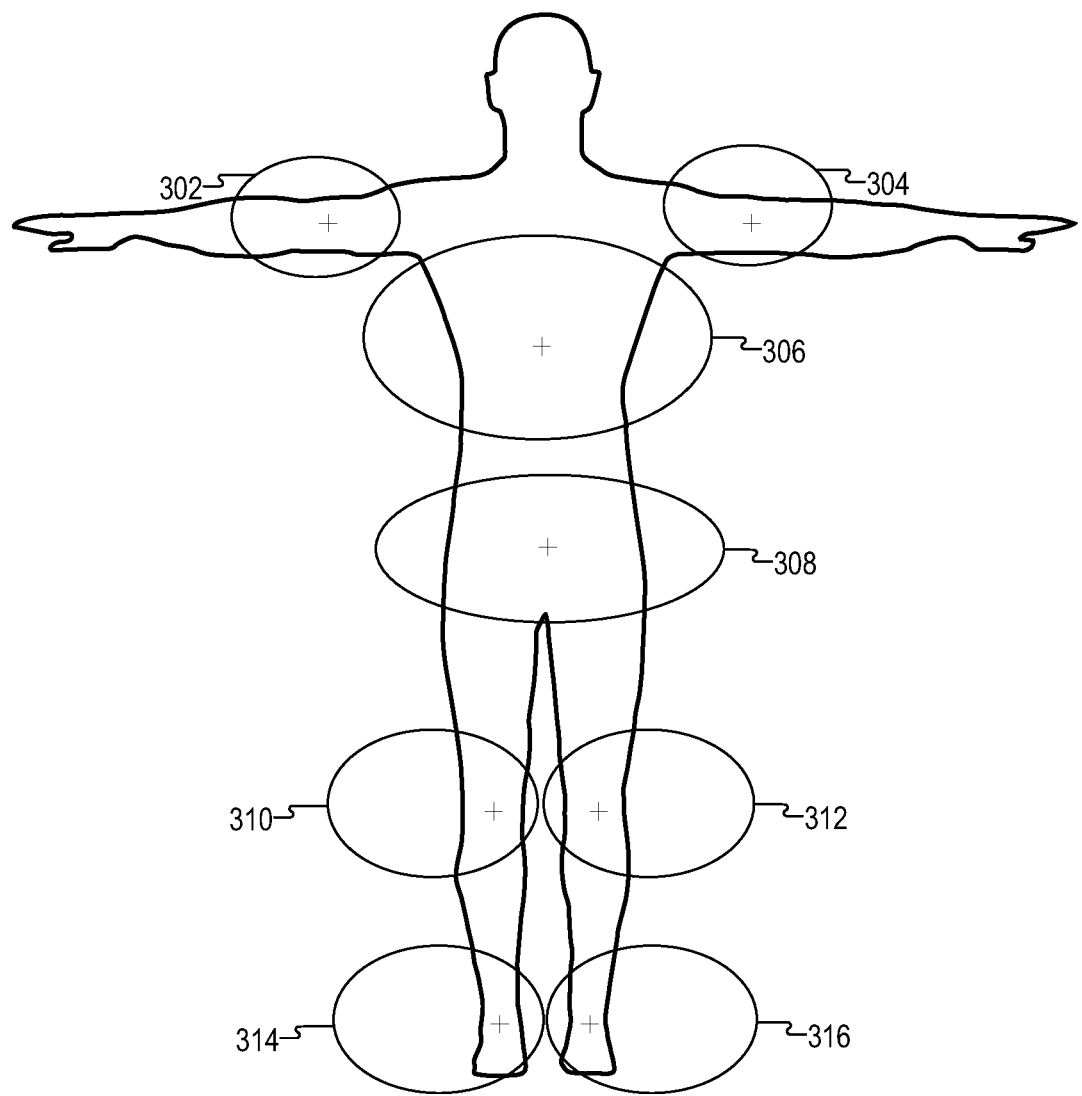
FIG. 3 illustrates a frontal view of a person that can use motion sensors and be calibrated for partial body or full body tracking according to aspects of the disclosure.

FIG. 3 illustrates a frontal view of a person that can use motion sensors and be calibrated for partial body or full body tracking according to aspects of the disclosure. In some aspects, the calibration methods disclosed herein align motion sensors identified in particular zones to determine calibration offsets, and the calibration offsets can be mapped into the virtual world to improve motion tracking and apply the motion from the physical world into the virtual world. The user avatar in the virtual world may not have the same physical characteristics (e.g., height, torso length, etc.), and the motion in the physical world may inaccurately be reflected in the virtual world.

In some aspects, the extended reality (XR) multiuser application is configured to receive or detect physical information, such as a height of the user. For example, an XR headset may include a plurality of sensors and may be configured to detect a height of the user. In another example, the user may input their height into the XR multiuser application or a service associated with the XR multiuser application. In some aspects, an XR application can be a complete VR experience, or can also be an augmented reality (AR) experience that synthesizes physical world content with virtual content. The XR multiuser application may also receive other physical information, such as information related to a disability (e.g., color blindness, handicap information, etc.), sex, and so forth. The XR multiuser application can identify a plurality of calibration zones within the physical world based on the physical information, and map a detected sensor to that corresponding calibration zone. As described below, each calibration zone is used to identify a sensor associated with a particular body part and a calibration offset relative to a fixed point in the corresponding calibration zone.

In one illustrative example, the XR multiuser application may use a median characteristic based on the input information to identify different regions. For example, a tall person will have different zones at different physical locations than a shorter person. In some aspects, the plurality of zones includes a right arm zone 302, a left arm zone 304, a chest zone 306, a hip zone 308, a right knee zone 310, a left knee zone 312, a right foot zone 314, and a left foot zone 316. Although each zone is illustrated in FIG. 3 as two-dimensional (2D), the zones are in 3D space because the motion sensors generally will not be aligned in a single plane. For example, a foot sensor may be placed at an end of the foot, and an arm tracker is attached to the arm with an armband, and these sensors are not aligned.

The XR multiuser application is configured to identify the various sensors that are attached to the wearer and during a calibration operation, which can be triggered during application startup, before the user enters a virtual world, or by a user (e.g., a recalibration). For example, the XR multiuser application can be configured with information related to various sensors, identify the sensors, and map the sensors to a particular joint. In some cases, the sensors can be attachable to multiple positions of the user (e.g., a motion sensor may be attachable to both the arms and the knee). The calibration process can require the user to stand to perform an initial calibration or input a pose that can be used to identify movement. An example of a calibration pose is a T-pose that is illustrated in FIG. 3, and the XR multiuser application will identify a corresponding sensor in a calibration zone (e.g., a right arm sensor into the right arm zone 302) and map the sensor to the body part of the user associated with the calibration zone. The XR multiuser application therefore maps each sensor to the position worn by the user irrespective of where the sensor was previously attached to the user. For example, if the user wears a motion sensor on their right knee in a previous instance and the user wears that same motion sensor on their left arm, the XR multiuser application will detect the sensor in the left arm zone 304. The XR multiuser application dynamically detects which motion sensor belongs to each body part regardless of any previous manual mapping.

In a further aspect, the XR multiuser application may also use the calibration pose illustrated in FIG. 3 to identify one or more calibration offsets associated with the sensor based on a fixed point associated with the zone. In some cases, the fixed point can be a center point (e.g., a center chest region), but some joints may have a neutral position that can result in the fixed point being offset. For example, the fixed point of an ankle is biased near a vertical centerline of the wearer, and a center point of the right foot zone 314 is farther to the left.

In some aspects, based on identifying a corresponding sensor in a calibration zone, the XR multiuser application may be configured to identify a calibration offset from the sensor to the fixed point. The fixed point may be associated with a joint corresponding to the user and can be mapped into the virtual reality world. For example, the right knee zone 310 and the left knee zone 312 can be associated with knee joints, and the right foot zone 314 and the left foot zone 316 may be associated with ankles. In some cases, the sensors may not necessarily be associated with a joint. For example, the arm motion sensors may be attached to the wearer's humerus. In some aspects, the elbow and shoulder joint positions can be identified based on a single motion sensor.

The XR multiuser application may be configured to identify the zones based on the height of the wearer. For example, if the user is in the calibrated standing position illustrated in FIG. 3, the XR multiuser application can identify the position of the corresponding motion sensor with respect to the fixed point and determine a first calibration offset. The first calibration offset indicates a position of the motion sensor with respect to the fixed point. For example, FIG. 4A illustrates a right knee calibration offset based on a position of a sensor attached to the knee.

Although not shown, the wearer can also be holding controllers that include motion sensors that enable various interactions within the virtual reality world. In one illustrative example, the controllers are separate handheld devices that detect motion and input into various input components (e.g., a joystick, buttons, etc.). The controllers can be used to identify wrist position in connection with the arm motion sensors to enable complex arm tracking. For example, the non-verbal input illustrated in FIG. 2

In some aspects, the user of the XR multiuser application may configure partial motion tracking by omitting one or more sensors for corresponding regions. For example, the user may omit knee and foot trackers in lieu of using an alternative input to move with the virtual reality world. The zones illustrated in FIG. 3 are exemplary and illustrate one mechanism to calibrate the positions of the various motion sensors. Additional zones may be configured, zones may be removed, and zones can be in different positions. For example, the arm zones can be associated with a neutral position with the user's hands located by a corresponding side of their body. Although the zones illustrated in FIG. 3 are distinct and do not overlap, the zones can overlap. For example, the right arm zone 302 and the left arm zone 304 may at least partially overlap with the chest zone 306. In some aspects, the calibration zone size may be user configurable and can be adjusted by the user. For example, the user may have difficulty calibrating a particular zone for various reasons, and may elect to enlarge that particular zone to obtain a calibration. In other aspects, all calibration zones can be scaled in size using a single setting to enable trackers that may be active in the VR system but are not attached to the body.

Figure 4A:
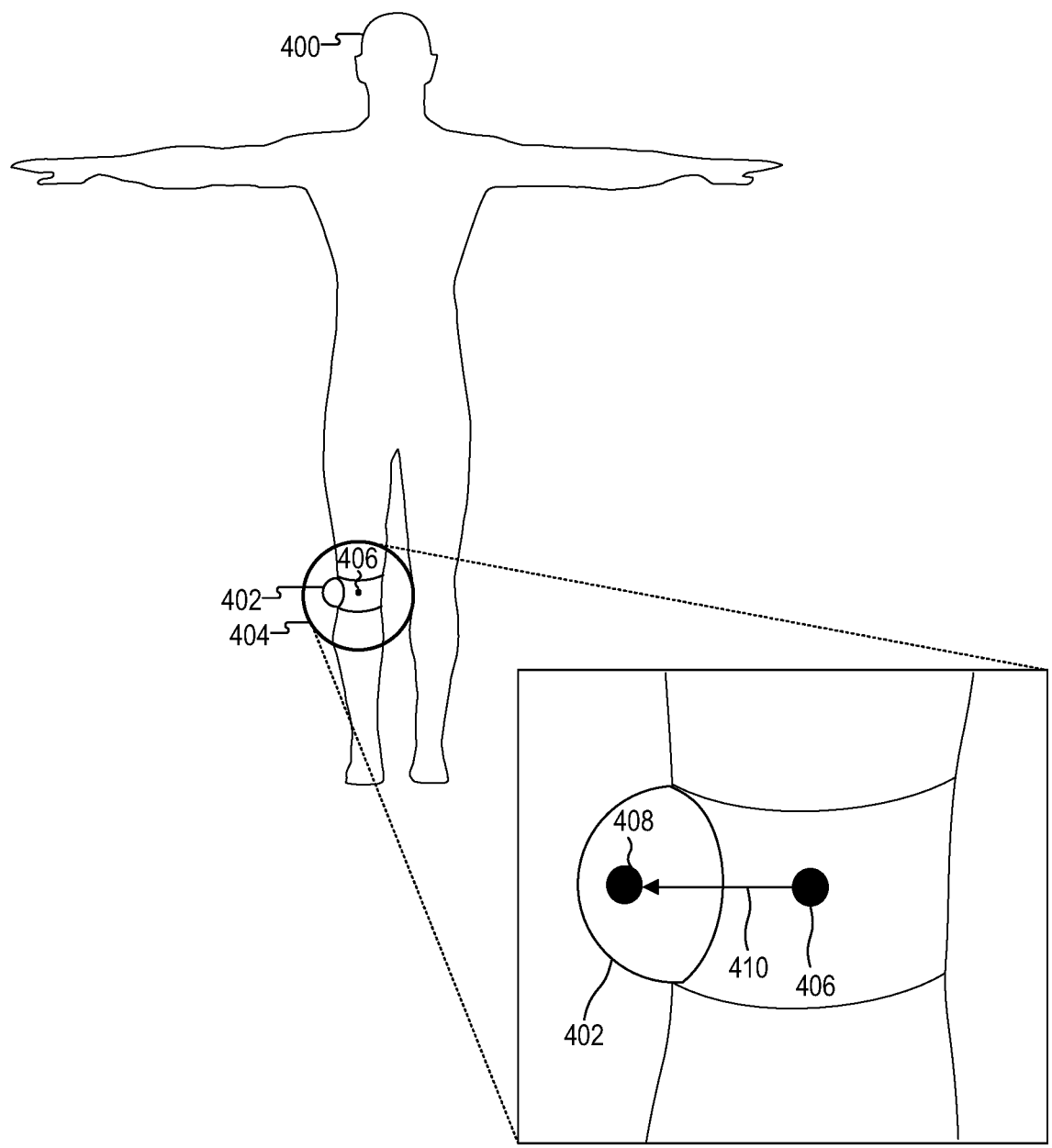
FIG. 4A is a conceptual illustration of a calibration of a sensor attached to a person's knee in accordance with some aspects of the disclosure.

FIG. 4A is a conceptual illustration of calibration pose to identify a knee calibration offset in accordance with some aspects of the disclosure. As noted above, a person 400 may be requested to perform an initial calibration based on a calibration pose. One example of a calibration pose is a T-pose illustrated in FIG. 4A. Other examples of a calibration pose include a neutral stand pose, a sitting pose, a kneeling pose, and so forth. In some cases, the calibration pose may vary based on the number of sensors, other physical handicaps, and other factors.

In the illustrated aspect, the person 400 is wearing a sensor 402 on their knee within a calibration zone 404 associated with the right knee with a fixed point 406. In this aspect, the fixed point is aligned with the joint of the person 400 in 3D space, and a motion sensor is depicted as being detected at point 408. The XR multiuser application is configured to determine the sensor 402 based on being positioned within the calibration zone and map the sensor 402 to the right knee of an avatar. The XR multiuser application may also determine a calibration offset from the fixed point 406 to the point 408. This vector is determined for each sensor associated with the person 400 based on the various calibration zones illustrated in FIG. 3. In this case, the calibration offset maps a position of the sensor 402 in the real world to a corresponding point in the virtual world. In this case, the fixed point corresponds to a central point of a knee joint.

The XR multiuser application is configured to determine avatar offsets based on the calibration offset. For example, irrespective of the avatar being used by a user, the XR multiuser application uses the calibration offset 410 and avatar offset 426 to map motion from the physical world into the virtual world with high fidelity to create an immersive and engaging experience. FIG. 4C below visually depicts an example of mapping motion of the person 400 into the virtual world based on the calibration offsets and the avatar offsets.

Figure 4B:
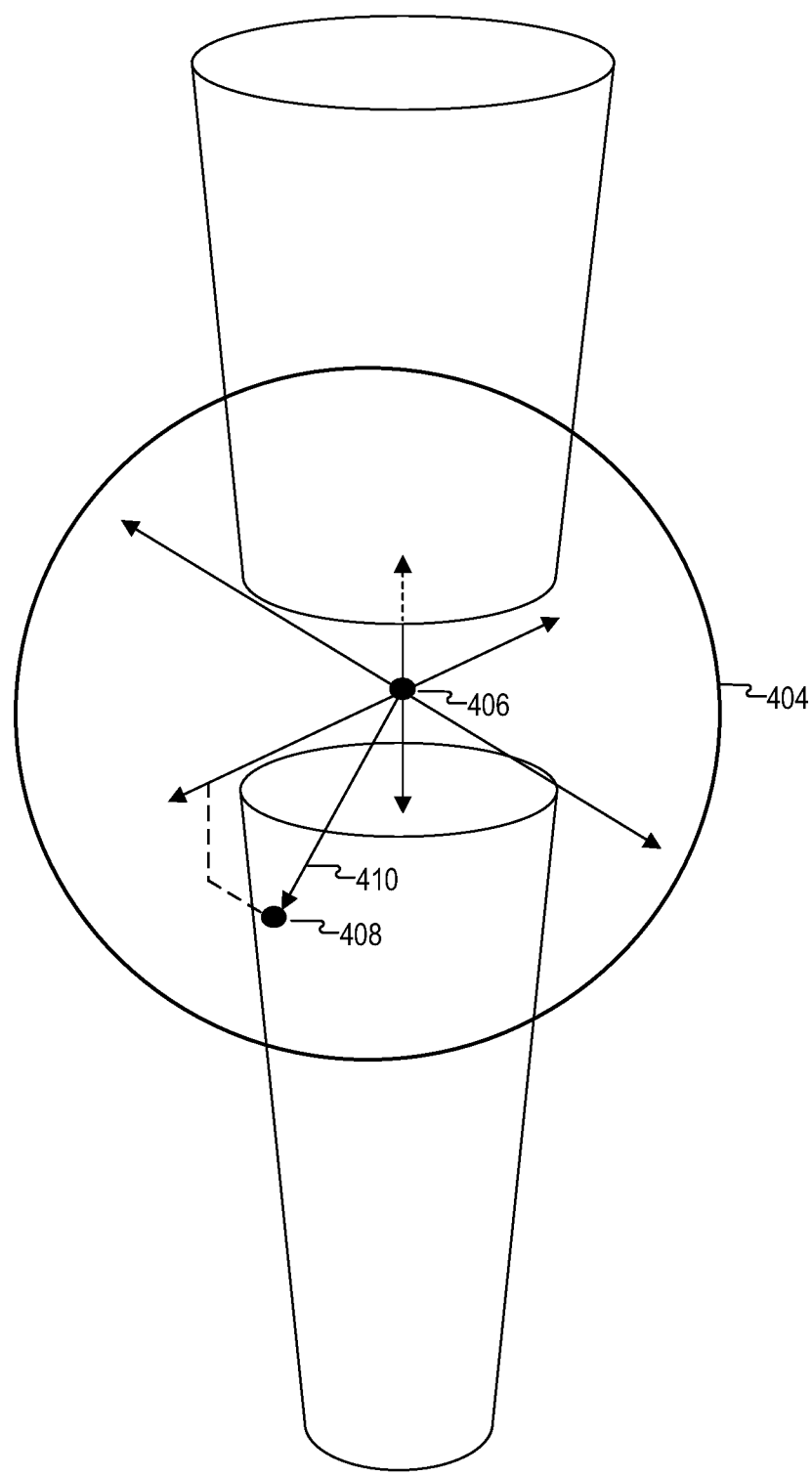
FIG. 4B illustrates a 3D conceptual view of a sensor attached to a person's knee in accordance with some aspects of the disclosure.
Figure 4C:
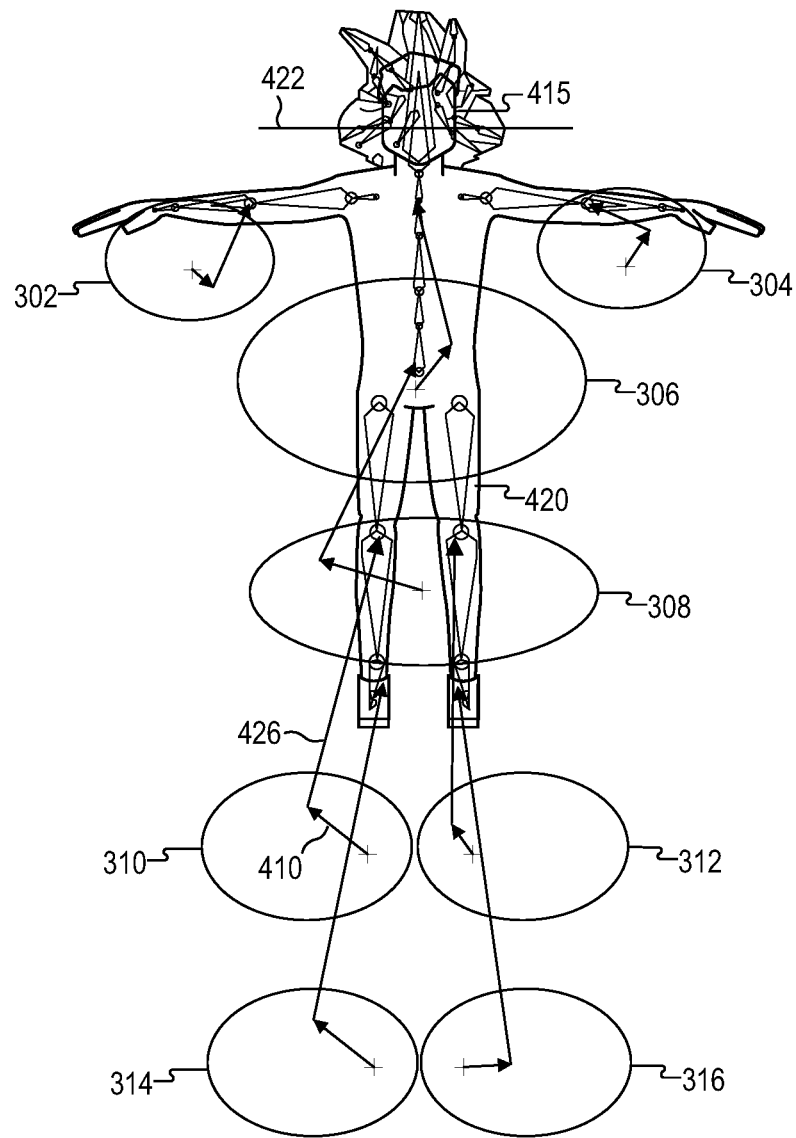
FIG. 4C is a conceptual illustration of determining avatar offsets based on the calibration offsets in accordance with some aspects of the disclosure.

FIG. 4B illustrates a 3D conceptual view of a sensor attached to a person's knee in accordance with some aspects of the disclosure. FIG. 4B illustrates a two dimensional (2D) view of the sensor, but the sensor 402 exists within a 3D space in the physical world. In one illustrative aspect, a person's knee is depicted at a fixed point 406 and data from the motion sensor is depicted as being detected at point 408. In this case, the XR multiuser application can identify a position of the motion sensor during calibration based on being positioned within the calibration zone 404, identify a fixed point based on the identified body part (e.g., the knee), and determine the calibration offset 410 associated with the motion sensor. The calibration offset identifies a 3D position from the person's joint to the location of the motion sensor.

FIG. 4C is a conceptual illustration of determining avatar offsets based on the calibration offsets in accordance with some aspects of the disclosure. In some aspects, the avatar offsets are specific to each avatar based on the calibration offsets. For example, because the calibration offsets will vary based on the position of the sensor and each sensor will have some amount of flexibility to allow the user to position the sensor for their comfort, the avatar offsets are calculated each time that a user deploys the avatar within the virtual world.

In some aspects, FIG. 4C illustrates that a person and their corresponding calibration zones are aligned within the 3D space by the XR multiuser application. In one aspect, a 3D model of a person 415 and the avatar 420 are aligned based on an eye position 422. The eye position 422 is used as the calibration zone based on the XR multiuser application (having accurate data related to the user's eye position because the user is wearing an HMD to consume the XR multiuser application. In this case, the 3D model of the person is representative and generated based on the user's input height, and only the head of the person 415 illustrated to prevent obscuring more pertinent details. The person 415 is also depicted in FIG. 3 and the corresponding calibration zones 302-316 are mapped into the 3D space based on the eye position 422.

In this illustrative aspect, each calibration zone includes a fixed point, a calibration offset, and an avatar offset. As noted above, the fixed point is mapped to a position associated with a person in the physical world and the calibration offset includes a vector from the fixed point to a position of a corresponding sensor. For example, the calibration offset 410 associated with the right knee of the person 415 indicates that the sensor 402 is attached to the outer edge of the right knee.

In some aspects, the avatar offset includes a vector from the motion sensor to a corresponding fixed point of the avatar 420. For example, when the avatar is loaded into the XR multiuser application for use in the virtual world, an avatar offset 426 is determined for each motion sensor based on the calibration offsets. For example, if the user uses the avatar 420, the XR multiuser application determines an avatar offset from the calibration offset 410 to the corresponding point of the avatar 420, such as the right knee as illustrated in FIG. 4C.

The XR multiuser application uses the avatar offset to map motion from the sensor into the virtual world. For example, because the person in the physical world is taller than the avatar 420, the motion detected in the physical world is calibrated into the virtual world based on the avatar offset 426. The motion thereby detected by the various motion sensors of the person in the physical world will accurately map into the virtual world. The differences in proportions between the avatar and the person is more important than the difference in absolute height because the avatar height is dynamically scaled to best match the user to the avatar's body part positions. In some aspects, the avatar's body part positions may significantly vary from that of the person, even when aligned at the same eye level, with an amount of positional variance that may cause a motion sensor to be aligned with a different joint. For example, a physical motion sensor worn on the person's hip may be positioned closest to the avatar's knee. The simple approach is to map the nearest motion sensor to the nearest avatar bone/joint, but in this example where proportional mismatch between the user and avatar is significant, this simple approach causes incorrect mapping of motion sensors to joints. According to various aspects, the calibration zones prevent the mapping of a motion sensor to an incorrect joint.

In some aspects, the XR multiuser application does not need to recalibrate the sensors when the user switches into a different avatar because the XR multiuser application stores the calibration offsets during calibration or recalibration. The XR multiuser application rather determines the avatar offset based on the stored calibration offsets when the avatar is loaded and deployed into the virtual world. For example, by aligning an eye position associated with the calibration zones with the eye position defined in the avatar to align the calibration zones with the loaded avatar, the alignment in the virtual world replaces a user. As a result, the user is not required to physically assume the calibration pose (e.g., the T-pose) each time a different avatar is loaded.

Although a single avatar offset is described, as shown in FIG. 4C, an avatar offset is determined for each of the calibration zones 302-316 that have corresponding motion sensors. For example, the user may only have upper body trackers, and the XR multiuser application may allocate motion sensors into corresponding zones during calibration and disable motion sensing for calibration zones without sensors. Additionally, some calibration zones may have multiple associated avatar offsets. As an example, the humerus bone of an avatar may include an offset for the elbow joint and the shoulder joint.

FIG. 5 illustrates a conceptual diagram of determining avatar offsets to apply to an avatar in the XR multiuser application in accordance with aspects of the disclosure. In particular, FIG. 5 illustrates a profile of a person 510 and a profile of an avatar 520 that have different heights. FIG. 5 is skewed to facilitate the description and the various properties may not be drawn to scale.

In some aspects, the motion applied to the motion sensor does not map into the XR multiuser application based on offsets within the physical world. For example, the avatar 520 is approximately half the height of the person 510. The person 510 includes an eye fixed point 512, a hip fixed point 514, a knee fixed point 516, and a foot fixed point 518, and the avatar 520 includes an eye fixed point 522, a hip fixed point 524, a knee fixed point 526, and a foot fixed point 528. As described below, the various fixed points can be used to identify various avatar offsets that can be used by the XR multiuser application to map motion in the physical world into the virtual world with high fidelity.

In one aspect, at least one fixed point may be used for aligning the person 510 and the avatar 520 to a common reference point. For example, the eye fixed point 512 of the person 510 and the eye fixed point 522 of the avatar 520 are aligned, and a position from the various fixed points is calculated. For example, a hip avatar offset 534 corresponds to a difference in the hip fixed point 514 of the person 510 and the hip fixed point 524 of the avatar 520, a knee avatar offset 536 corresponds to a difference in the knee fixed point 516 of the person 510 and the knee fixed point 526 of the avatar 520, and a foot avatar offset 538 corresponds to a difference in the foot fixed point 518 of the person 510 and the foot fixed point 528 of the avatar 520.

In some aspects, the avatar offsets in FIG. 5 (e.g., the hip avatar offset 534, the knee avatar offset 536, the foot avatar offset 538) can be used to map motion from the person 510 to the avatar 520 in conjunction with a calibration offset (e.g., calibration offset 410). As described above, the calibration offset 410 is associated with a measurement from a fixed point of the wearer's body to the sensor. Based on the various avatar offsets in FIG. 5, the XR multiuser application may determine mapping information that maps the motion of the sensors in the physical world into the motion of the avatar in the virtual world. In some cases, the XR multiuser application can also determine mapping information during an instance of the XR multiuser application. For example, in some cases, the user may switch to wear a different avatar within the XR multiuser application, and the XR multiuser application can recompute the mapping information based on the selected avatar as described above.

FIG. 5 illustrates the translation of human proportions based on the motion sensor in the virtual world based on a single dimension (e.g., height). The avatar offsets are illustrated to show one dimensional difference based on the height, but the avatar offsets can be 2D or 3D. For example, the avatar may be significantly wider or narrower, may have joints located in anatomically incorrect positions, and so forth. The techniques to map movement in the physical world can be applied irrespective of differences in the anatomy of the avatar in the virtual world.

Figure 6A:
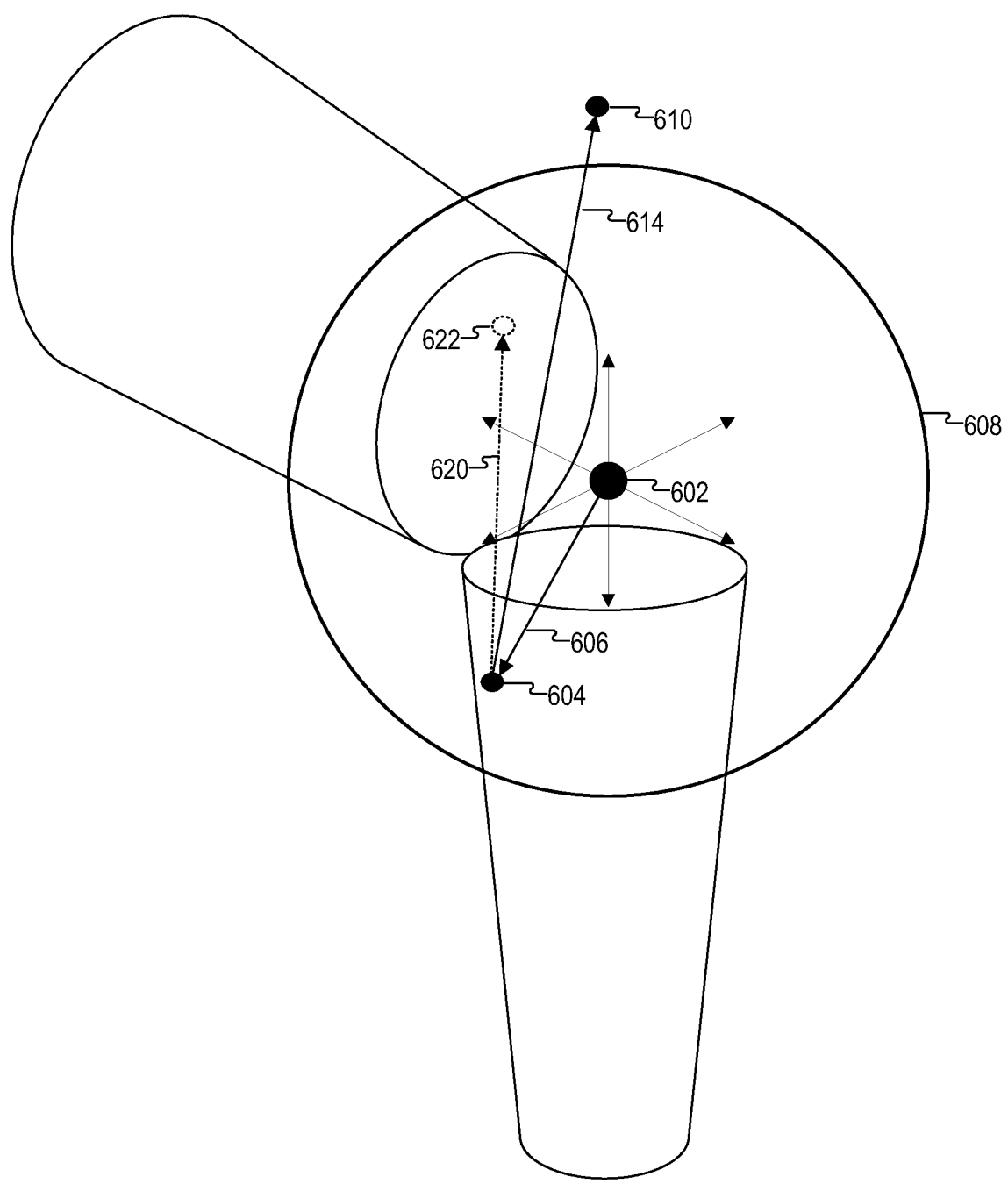
FIGS. 6A and 6B illustrate a conceptual illustration of a sensor attached to a person's knee and mapping motion of the sensor to an avatar's knee in a virtual world in accordance with some aspects of the disclosure.

FIG. 6A illustrates a conceptual illustration of a sensor attached to a person's knee and mapping motion of the sensor to an avatar's knee in a virtual world in accordance with some aspects of the disclosure. In some aspects, a fixed point 602 may correspond to a center point of a person's knee, which is determined based on the person's input height in the XR multiuser application. A motion sensor is attached to the person's knee and the XR multiuser application determines a position 604 of the motion sensor attached to the knee and then determines a calibration offset 606 from the fixed point 602 to the position 604. As described above, the fixed point 602 may be associated with a corresponding zone 608, with the fixed point 602 corresponding to a knee joint. In some cases, the XR multiuser application may be able to calibrate the motion sensor attached to the person's knee based on the identification that the person is in a seated position. For example, the person's torso would not align in a vertical plane with the motion sensor located at the position 604, and so forth.

The XR multiuser application may determine a knee fixed point 610 based on the differences between the person's estimated physical anatomy and the anatomy of the user avatar. In some cases, the user avatar may include information (e.g., at design time, via standard avatar armature rigging practices, etc.) that identifies various points of interest such as the knee fixed point 610. Based on the knee fixed point 610, the XR multiuser application may be configured to compute at least one avatar offset 614. Based on the calibration offset 606 and the avatar offset 614, the XR multiuser application may be configured to translate motion with respect to the fixed point 602 to the avatar at knee fixed point 610. For example, the motion can be related to a leg bone (e.g., fibular) that attaches to the avatar's knee.

In some cases, the avatar offsets can also be applied to other aspects of the virtual world. For example, the user may be holding a controller that is not fixed to the user's body itself, and the user may input motion that identifies the motion of the hand and the wrist. For example, the controller may provide 6 degrees of freedom (6 DoF) that allows motion input in cartesian coordinates and rotational coordinates (e.g., roll, pitch yaw). In some cases, the avatar offsets and/or the calibrated offset can be used to identify the motion of the hand and wrist to allow complex non-verbal communication. An example of non-verbal communication is described above with reference to FIG. 2.

In other aspects, the VR headset may be used in conjunction with the motion sensors to identify a calibrated offset, identify motion sensors, etc. For example, the VR headset may include at least one of a dot projection device and an image sensor to measure distances to various objects within the environment. In one illustrative aspect, the dot projection may identify a position of at least one sensor attached to the user's body and identify the sensor, and the sensor's calibration based on the position with respect to the VR headset. In another example, the VR headset may present a user interface (UI) based on a visual see through (VST) that uses an image sensor to capture images in the physical world and project the images to the wearer using the VR headset, and the UI may facilitate identification of various sensors.

In another aspect, the motion within the physical world may be scaled due to differences in anatomy of the person and the avatar within the virtual world. In one illustrative example, the avatar may include metadata that identifies a zone of movement that can be used for calibration of avatar offsets.

FIG. 6A is a 3D view of a user's knee in the physical world while the user is in a sitting pose. The user may switch avatars while executing the XR multiuser application in the sitting pose. In this case, because the new avatar may have different physical characteristics within the virtual world, the XR multiuser application may be configured to determine the avatar offsets based on the stored calibration offsets. In one aspect, the XR multiuser application may use the stored offsets to determine an updated knee fixed point of the avatar within a fixed pose (e.g., the T-pose) and compute a second avatar offset 620. In the example illustrated in FIG. 6A, the user is in a sitting position with the knee bent 90 degrees and the XR multiuser application uses the position 604 of the motion sensor and the second avatar offset 620 to identify a second knee fixed point 622 based on the different avatar dimensions. In effect, the XR multiuser application can map the user's position at the time the user switches from the first avatar to the second avatar without requiring any calibration.

Figure 6B:
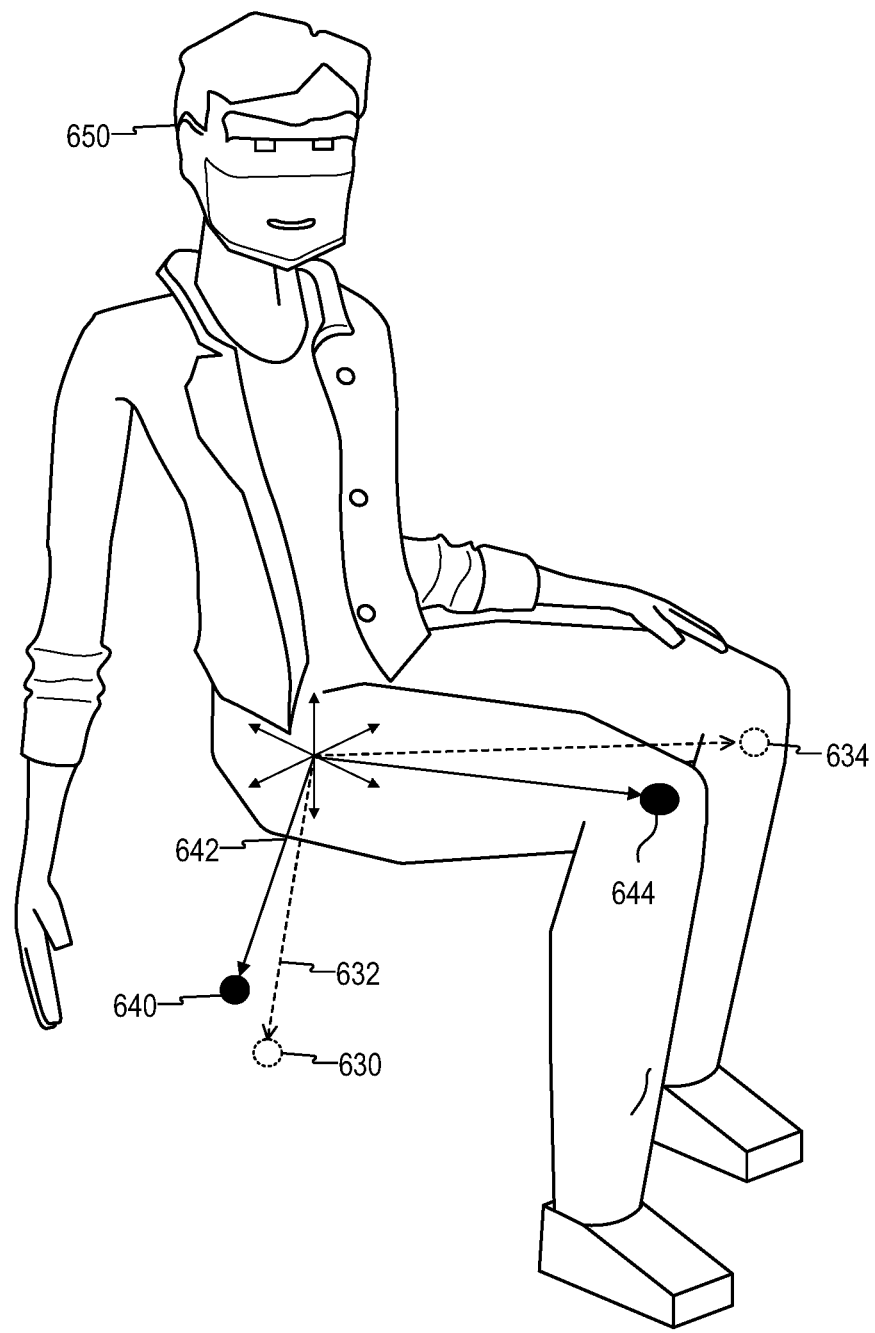

FIG. 6B is a 3D conceptual view of a second avatar 650 in the sitting position and a representation of the offsets. A fixed point 630 corresponds to a right knee of a first avatar (not shown) within the calibration pose with an avatar offset 632 representing a distance from a point that is associated with the motion sensor (e.g., the calibration offset). The user is sitting and the avatar offset 632 is rotated in 3D space to point 634. When the user elects to switch into the second avatar 650, the XR multiuser application determines an updated fixed point 640 associated with the right knee of the second avatar 650 and then determines a second avatar offset 642 for the knee. Based on the current position of the motion sensor, the XR multiuser application rotates the second avatar offset 642 in 3D space to point 644. The XR multiuser application can then render and display the avatar in the virtual world based on the second avatar offset 642 applied to the current position and rotation of the motion sensor resulting in the point 644.

Figure 7:
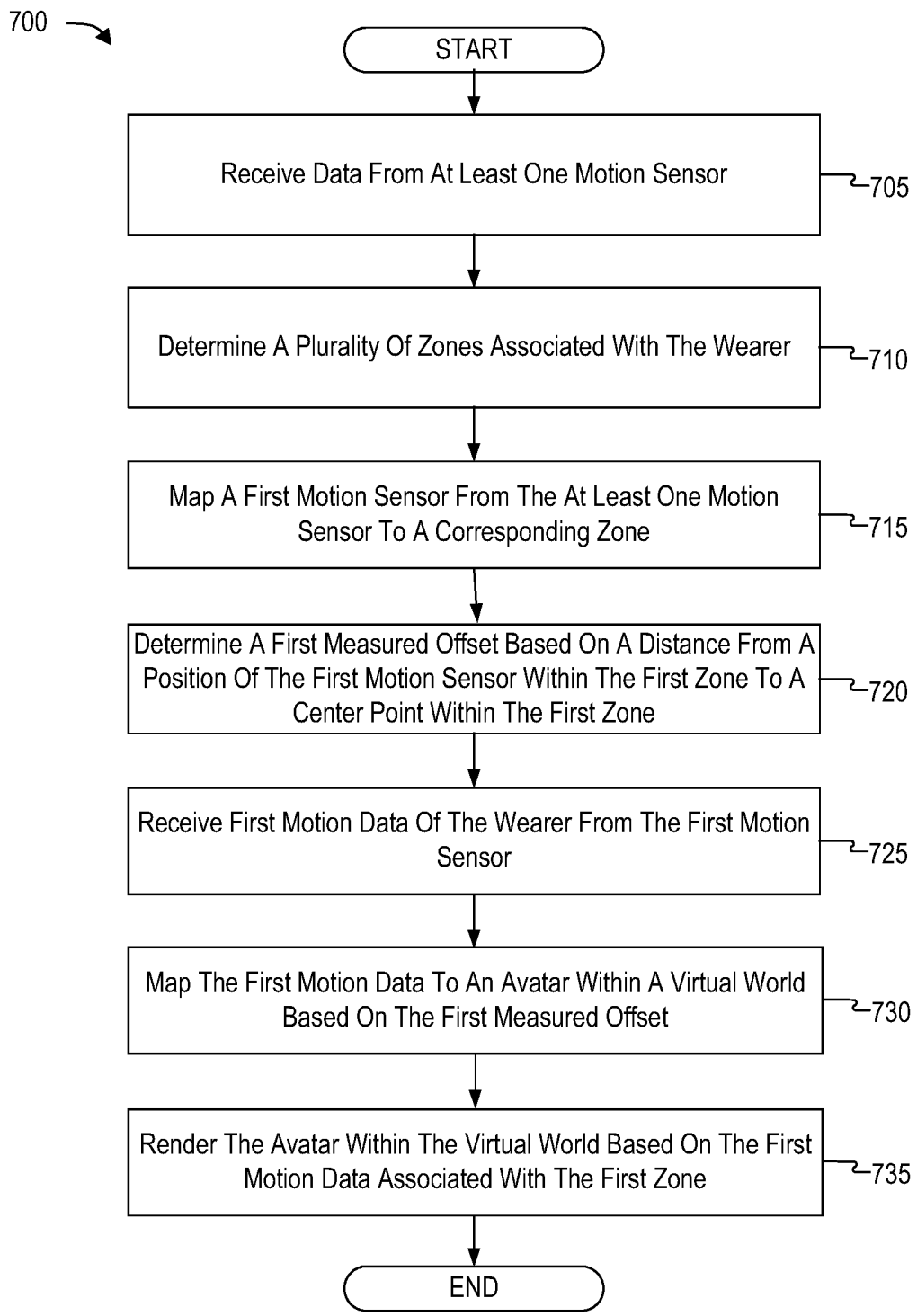
FIG. 7 illustrates an example method 700 for tracking and calibrating motion sensors attached to a wearer and mapping motion of the wearer into a virtual world in accordance with some aspects of the disclosure.

FIG. 7 illustrates an example method 700 for tracking and calibrating motion sensors attached to a wearer and mapping motion of the wearer into a virtual world in accordance with some aspects of the disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

The method 700 may be performed by a software application executing on a hardware device, which can also be referred to as an XR device that provides VR or AR content. For example, the software application may be an XR multiuser application that is executing on a head-mounted device (HMD), such as a VR headset, or AR glasses. In other aspects, the software application may be executed on a host computer and provided to the XR device. The software application may also be executed on a mobile device, or another device that includes a computing system (e.g., computing system 1200) and is capable of rendering graphics and either displaying the graphics or providing the graphics to another device to display. Based on the input motion using a controller such as an XR controller, the HMD device may be configured to render the motion of an avatar within the XR multiuser application and display the motion to the wearer.

According to some examples, the method is executed by an XR device and receives data from at least one motion sensor at block 705. As described above, a user of the XR device, who may also be referred to as a person wearing the XR device, may desire to interact within the virtual world using multiple motion sensors, and each motion sensor can be attached to a different body part. For example, the user may have a motion sensor for tracking arm motion, chest motion, hip motion, knee motion, and foot motion. In some cases, the arm motion can be mapped to shoulder motion, and the user may also have a controller (e.g., a VR or an XR controller) that is held in the user's hands.

According to some examples, the XR device may determine a plurality of zones associated with the wearer at block 710. In this aspect, each zone corresponds to the motion of a body part or a joint of the wearer that can be tracked. According to one example, the plurality of zones comprises at least one of a chest zone, a hip zone, a left knee zone, a right knee zone, a left foot zone, a right foot zone, a left elbow zone, and a right elbow zone. The properties of the zone (e.g., the 3D shape of the zone) and a fixed point associated with the zone may be based on the average characteristics of at least one property associated with a person. For example, the plurality of zones may be determined by dividing regions in space into the plurality of zones based on a height of the wearer.

In some aspects, the plurality of zones may be determined before the motion is received. For example, when the XR device begins execution of an XR multiuser application, the XR multiuser may identify the zones based on a previously input height of the user, a determined height of the XR device, and so forth.

The XR device may map a first motion sensor from the at least one motion sensor to a corresponding zone at block 715. The mapping can occur at different stages, for example, when an instance of the XR multiuser application begins, the XR multiuser application may need to map sensors attached to the user body. As noted above, some sensors may be attachable to multiple positions of the body. For example, a motion sensor can be attachable to different body parts (e.g., either knee or either arm) and perform a calibration to identify a corresponding body part associated with each user. In one illustrative example, the XR multiuser application may request the user perform a specific pose (e.g., the pose illustrated in FIG. 3) to identify sensors and calibrate sensors.

When the user is entering the specific pose, the XR device may determine a measured offset based on a distance from a position of a corresponding motion sensor within a corresponding zone to a fixed point within that zone at block 720. As described above, the fixed point may be a center point but could be biased towards a neutral position. For example, referring to FIG. 3, the right foot zone 314 has a fixed point that is biased towards a center line of a person. When the XR device wearer enters the pose, the XR device can track the motion and identify each sensor in each zone. After the user holds the position for a small time, the XR device is able to identify a calibration offset from the sensor to the fixed point, which can be used to track the motion. The fixed point can be a joint, but may also be a bone such as the humerus. In some cases, the pose may also be used to calibrate an external controller that is being held by the wearer of the XR device.

According to some examples, the XR device receives first motion data of the wearer from the first motion sensor at block 725. For example, the wearer may input an arm motion, or take a step to cause an avatar to navigate within the virtual world. In one aspect, the mapping of the motion is based on a second offset associated with an avatar (e.g., an avatar offset).

In some aspects, the second offset may be determined based on mapping the person's information to the avatar. According to one example, the XR device may determine a first calibrated offset for a first body part or joint corresponding to the first zone based on the eye height of the avatar and the first measured offset. An example of determining the first calibrated offset comprises aligning the eye height of the avatar to an estimated eye height of the wearer, determining a second offset from a fixed point on a corresponding zone to the center point within the first zone. For example, the second offset may be from a fixed point associated with a right foot (e.g., an ankle) of the person to a fixed point associated with a right foot of the avatar.

The aligning of an asset such as an eye can be important because not all characteristics of the avatar correspond to the movement within the world. For example, a significant amount of hair can affect height but does not affect joint mobility within the virtual world. After obtaining the second offset, the XR device may apply the second offset to the first measured offset to yield the first calibrated offset. The XR device can then map the second offset to a corresponding object associated with the avatar. The zone of the person is dictated based on median characteristics, and the size of the zone of the avatar can be either determined at design time by a designer or at run time by the application. For example, the designer of the avatar may dictate the mobility of a joint, but in other cases, the XR multiuser application can limit mobility based on joints, collisions, and so forth.

After receiving and mapping the motion, the XR device may render the avatar within the virtual world based on the first motion data associated with the first zone at block 735.

In further aspects of the method in FIG. 7, the XR device can also enable a user to change their avatar. For example, the XR device can receive an input from a wearer of the XR device to change their avatar. In this case, the XR device may determine a second calibrated offset (e.g., the avatar offset) for the first body part or joint corresponding to the first zone based on an eye height of the second avatar and the first measured offset, and then render the second avatar within the virtual world based on second motion data associated with the first zone. An example of alignment based on the eye height and determining the avatar offsets is illustrated in FIG. 4C, and an example of recalculating avatar offsets based on changing avatars is illustrated in FIGS. 6A and 6B.

Figure 8:
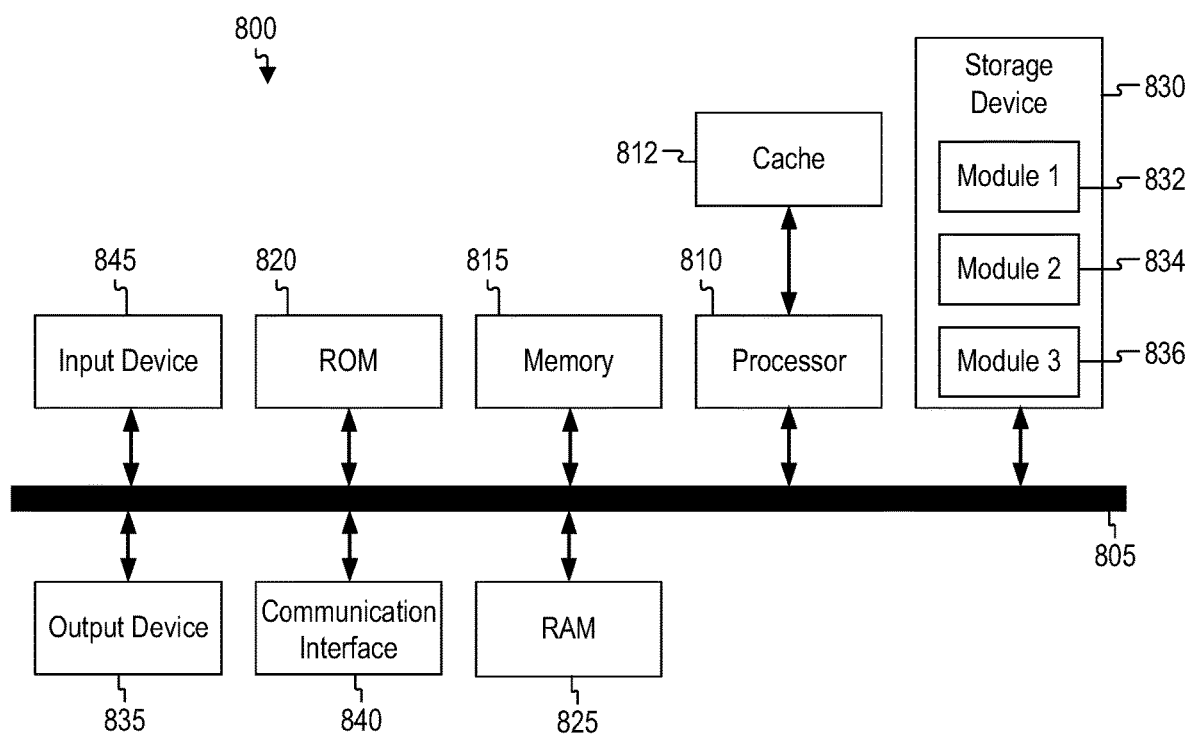
FIG. 8 shows an example of a system for implementing certain aspects of the present technology.

FIG. 8 shows an example of computing system 800, which can be for example any computing device that part of an XR system, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810.

Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative aspects of the disclosure include:

Aspect 1. A method, comprising: receiving data from at least one motion sensor, wherein each motion sensor from the at least one motion sensor are attached to a different body part of a wearer for tracking movement of the wearer; determining a plurality of zones associated with the wearer, wherein each zone corresponds to motion of a body part or a joint of the wearer that can be tracked; mapping a first motion sensor from the at least one motion sensor to a corresponding zone, wherein the first motion sensor corresponds to a first zone; determining a first measured offset based on a distance from a position of the first motion sensor within the first zone to a fixed point within the first zone; receiving first motion data of the wearer from the first motion sensor; mapping the first motion data to an avatar within a virtual world based on the first measured offset; and rendering the avatar within the virtual world based on the first motion data associated with the first zone.

Aspect 2. The method of Aspect 1, wherein determining the plurality of zones comprises dividing regions in space into the plurality of zones based on a height of the wearer, wherein the plurality of zones is determined based on median characteristics associated with a person.

Aspect 3. The method of any of Aspects 1 to 2, wherein each motion sensor of the at least one motion sensor is attached to the wearer.

Aspect 4. The method of any of Aspects 1 to 3, wherein the plurality of zones comprise at least one of a chest zone, a hip zone, a left knee zone, a right knee zone, a left foot zone, a right foot zone, a left elbow zone, and a right elbow zone.

Aspect 5. The method of any of Aspects 1 to 4, further comprising: determining a first calibrated offset for a first body part or joint corresponding to the first zone based on an eye height of the avatar and the first measured offset.

Aspect 6. The method of any of Aspects 1 to 5, wherein determining the first calibrated offset comprises: aligning the eye height of the avatar to an estimated or measured eye height of the wearer; determining a second offset from a fixed point on a corresponding zone to the fixed point within the first zone, wherein the second offset is applied to the first measured offset to yield the first calibrated offset.

Aspect 7. The method of any of Aspects 1 to 6, wherein mapping the first motion data corresponding to the first zone based on the first measured offset to the avatar within the virtual world comprises mapping the second offset to a corresponding object associated with the avatar.

Aspect 8. The method of any of Aspects 1 to 7, wherein mapping the first motion data to the avatar within the virtual world comprises: scaling movement applied to the avatar based on metadata associated with the avatar.

Aspect 9. The method of any of Aspects 1 to 8, further comprising: receiving an input to change from the avatar to a second avatar; determining a second calibrated offset for the first body part or joint corresponding to the first zone based on an eye height of the second avatar and the first measured offset; and rendering the second avatar within the virtual world based on second motion data associated with the first zone.

Aspect 10. An apparatus includes a storage (implemented in circuitry) configured to store instructions and a processor. The processor configured to execute the instructions and cause the processor to: receive data from at least one motion sensor, wherein each motion sensor from the at least one motion sensor are attached to a different body part of a wearer for tracking movement of the wearer; determine a plurality of zones associated with the wearer, wherein each zone corresponds to motion of a body part or a joint of the wearer that can be tracked; map a first motion sensor from the at least one motion sensor to a corresponding zone, wherein the first motion sensor corresponds to a first zone; determine a first measured offset based on a distance from a position of the first motion sensor within the first zone to a fixed point within the first zone; receive first motion data of the wearer from the first motion sensor; map the first motion data to an avatar within a virtual world based on the first measured offset; and render the avatar within the virtual world based on the first motion data associated with the first zone.

Aspect 11. The apparatus of Aspect 10, wherein determining the plurality of zones comprises dividing regions in space into the plurality of zones based on a height of the wearer, wherein the plurality of zones is determined based on median characteristics associated with a person.

Aspect 12. The apparatus of any of Aspects 10 to 11, wherein each motion sensor of the at least one motion sensor is attached to the wearer.

Aspect 13. The apparatus of any of Aspects 10 to 12, wherein the plurality of zones comprise at least one of a chest zone, a hip zone, a left knee zone, a right knee zone, a left foot zone, a right foot zone, a left elbow zone, and a right elbow zone.

Aspect 14. The apparatus of any of Aspects 10 to 13, wherein the processor is configured to execute the instructions and cause the processor to: determine a first calibrated offset for a first body part or joint corresponding to the first zone based on an eye height of the avatar and the first measured offset.

Aspect 15. The apparatus of any of Aspects 10 to 14, wherein the processor is configured to execute the instructions and cause the processor to: align the eye height of the avatar to an estimated or measured eye height of the wearer; determine a second offset from a fixed point on a corresponding zone to the fixed point within the first zone, wherein the second offset is applied to the first measured offset to yield the first calibrated offset.

Aspect 16. The apparatus of any of Aspects 10 to 15, wherein mapping the first motion data corresponding to the first zone based on the first measured offset to the avatar within the virtual world comprises mapping the second offset to a corresponding object associated with the avatar.

Aspect 17. The apparatus of any of Aspects 10 to 16, wherein scaling movement applied to the avatar based on metadata associated with the avatar.

Aspect 18. The apparatus of any of Aspects 10 to 17, wherein the processor is configured to execute the instructions and cause the processor to: receive an input to change from the avatar to a second avatar; determine a second calibrated offset for the first body part or joint corresponding to the first zone based on an eye height of the second avatar and the first measured offset; and render the second avatar within the virtual world based on second motion data associated with the first zone.

Aspect 19. A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive data from at least one motion sensor, wherein each motion sensor from the at least one motion sensor are attached to a different body part of a wearer for tracking movement of the wearer; determine a plurality of zones associated with the wearer, wherein each zone corresponds to motion of a body part or a joint of the wearer that can be tracked; map a first motion sensor from the at least one motion sensor to a corresponding zone, wherein the first motion sensor corresponds to a first zone; determine a first measured offset based on a distance from a position of the first motion sensor within the first zone to a fixed point within the first zone; receive first motion data of the wearer from the first motion sensor; map the first motion data to an avatar within a virtual world based on the first measured offset; and render the avatar within the virtual world based on the first motion data associated with the first zone.

Aspect 20. The computer readable medium of Aspect 19, wherein determining the plurality of zones comprises dividing regions in space into the plurality of zones based on a height of the wearer, wherein the plurality of zones is determined based on median characteristics associated with a person.

Aspect 21. The computer readable medium of any of Aspects 19 to 20, wherein each motion sensor of the at least one motion sensor is attached to the wearer.

Aspect 22. The computer readable medium of any of Aspects 19 to 21, wherein the plurality of zones comprise at least one of a chest zone, a hip zone, a left knee zone, a right knee zone, a left foot zone, a right foot zone, a left elbow zone, and a right elbow zone.

Aspect 23. The computer readable medium of any of Aspects 19 to 22, wherein the processor is configured to execute the computer readable medium and cause the processor to: determine a first calibrated offset for a first body part or joint corresponding to the first zone based on an eye height of the avatar and the first measured offset.

Aspect 24. The computer readable medium of any of Aspects 19 to 23, wherein the processor is configured to execute the computer readable medium and cause the processor to: align the eye height of the avatar to an estimated or measured eye height of the wearer; determine a second offset from a fixed point on a corresponding zone to the fixed point within the first zone, wherein the second offset is applied to the first measured offset to yield the first calibrated offset.

Aspect 25. The computer readable medium of any of Aspects 19 to 24, wherein mapping the first motion data corresponding to the first zone based on the first measured offset to the avatar within the virtual world comprises mapping the second offset to a corresponding object associated with the avatar.

Aspect 26. The computer readable medium of any of Aspects 19 to 25, wherein scaling movement applied to the avatar based on metadata associated with the avatar.

Aspect 27. The computer readable medium of any of Aspects 19 to 26, wherein the processor is configured to execute the computer readable medium and cause the processor to: receive an input to change from the avatar to a second avatar; determine a second calibrated offset for the first body part or joint corresponding to the first zone based on an eye height of the second avatar and the first measured offset; and render the second avatar within the virtual world based on second motion data associated with the first zone.

What is claimed is:

1. A method, comprising:
    receiving data from a plurality of motion sensors, wherein a portion of the plurality of motion sensors are attached to different body parts of a wearer for tracking movement of the wearer;
    determining a plurality of zones associated with the wearer, wherein a zone corresponds to motion of a body part or a joint of the wearer that can be tracked;
    mapping a first motion sensor from the motion sensors to a corresponding zone, wherein the first motion sensor corresponds to a first zone;
    determining a first measured offset based on a distance from a position of the first motion sensor within the first zone to a fixed point within the first zone;
    determining a first calibrated offset for a first body part or joint corresponding to the first zone based on an eye height of an avatar and the first measured offset;
    receiving first motion data of the wearer from the first motion sensor;
    mapping the first motion data to the avatar within a virtual world based on the first calibrated offset; and
    rendering the avatar within the virtual world based on the first motion data associated with the first zone.

2. The method of claim 1, wherein determining the plurality of zones comprises dividing regions in space into the plurality of zones based on a height of the wearer, wherein the plurality of zones is determined based on median characteristics associated with a person.

3. The method of claim 1, wherein the plurality of motion sensors are attached to the wearer.

4. The method of claim 1, wherein the plurality of zones comprise at least one of a chest zone, a hip zone, a left knee zone, a right knee zone, a left foot zone, a right foot zone, a left elbow zone, and a right elbow zone.

5. The method of claim 1, wherein determining the first calibrated offset comprises:
    aligning the eye height of the avatar to an estimated or measured eye height of the wearer;
    determining a second offset from a fixed point on a corresponding zone to the fixed point within the first zone, wherein the second offset is applied to the first measured offset to yield the first calibrated offset.

6. The method of claim 5, wherein mapping the first motion data corresponding to the first zone based on the first measured offset to the avatar within the virtual world comprises mapping the second offset to a corresponding object associated with the avatar.

7. The method of claim 1, further comprising:
receiving an input to change from the avatar to a second avatar;
determining a second calibrated offset for the first body part or joint corresponding to the first zone based on an eye height of the second avatar and the first measured offset; and
rendering the second avatar within the virtual world based on second motion data associated with the first zone.

8. The method of claim 5, wherein mapping the first motion data to the avatar within the virtual world comprises:
scaling movement applied to the avatar based on metadata associated with the avatar.

9. A system comprising:
a storage configured to store instructions; and
a processor configured to execute the instructions and cause the processor to:
receive data from a plurality of motion sensors, wherein the plurality of motion sensors are attached to different body parts of a wearer for tracking movement of the wearer;
determine a plurality of zones associated with the wearer, wherein the zones correspond to motion of a body part or a joint of the wearer that can be tracked;
map a first motion sensor from the plurality of motion sensors to a corresponding zone, wherein the first motion sensor corresponds to a first zone;
determine a first measured offset based on a distance from a position of the first motion sensor within the first zone to a fixed point within the first zone;
determine a first calibrated offset for a first body part or joint corresponding to the first zone based on an eye height of an avatar and the first measured offset;
receive first motion data of the wearer from the first motion sensor;
map the first motion data to the avatar within a virtual world based on the first calibrated offset; and
render the avatar within the virtual world based on the first motion data associated with the first zone.

10. The system of claim 9, wherein determining the plurality of zones comprises dividing regions in space into the plurality of zones based on a height of the wearer, wherein the plurality of zones is determined based on median characteristics associated with a person.

11. The system of claim 9, wherein the plurality of motion is sensors are attached to the wearer.

12. The system of claim 9, wherein the plurality of zones comprise at least one of a chest zone, a hip zone, a left knee zone, a right knee zone, a left foot zone, a right foot zone, a left elbow zone, and a right elbow zone.

13. The system of claim 9, wherein the processor is configured to execute the instructions and cause the processor to:
align the eye height of the avatar to an estimated or measured eye height of the wearer;
determine a second offset from a fixed point on a corresponding zone to the fixed point within the first zone, wherein the second offset is applied to the first measured offset to yield the first calibrated offset.

14. The system of claim 13, wherein mapping the first motion data corresponding to the first zone based on the first measured offset to the avatar within the virtual world comprises mapping the second offset to a corresponding object associated with the avatar.

15. The system of claim 13, wherein the processor is configured to execute the instructions and cause the processor to:
scale movement applied to the avatar based on metadata associated with the avatar.

16. The system of claim 9, wherein the processor is configured to execute the instructions and cause the processor to:
receive an input to change from the avatar to a second avatar;
determine a second calibrated offset for the first body part or joint corresponding to the first zone based on an eye height of the second avatar and the first measured offset; and
render the second avatar within the virtual world based on second motion data associated with the first zone.

17. A non-transitory computer readable medium comprising instructions, the instructions, when executed by a computing system, cause the computing system to:
receive data from a plurality of motion sensors, wherein the plurality of motion sensors are attached to a different body part of a wearer for tracking movement of the wearer;
determine a plurality of zones associated with the wearer, wherein a zone corresponds to motion of a body part or a joint of the wearer that can be tracked;
map a first motion sensor of the plurality of motion sensors to a corresponding zone, wherein the first motion sensor corresponds to a first zone;
determine a first measured offset based on a distance from a position of the first motion sensor within the first zone to a fixed point within the first zone;
determine a first calibrated offset for a first body part or joint corresponding to the first zone based on an eye height of an avatar and the first measured offset;
receive first motion data of the wearer from the first motion sensor;
map the first motion data to the avatar within a virtual world based on the first calibrated offset; and
render the avatar within the virtual world based on the first motion data associated with the first zone.

18. The computer readable medium of claim 17, determining the plurality of zones comprises dividing regions in space into the plurality of zones based on a height of the wearer, wherein the plurality of zones is determined based on median characteristics associated with a person.

* * * * *